United States Patent
Zhang

(10) Patent No.: US 12,078,217 B2
(45) Date of Patent: Sep. 3, 2024

(54) CALIPER COVER ASSEMBLY AND PRODUCTION METHOD THEREOF

(71) Applicant: Jianping Zhang, Shanghai (CN)

(72) Inventor: Jianping Zhang, Shanghai (CN)

( * ) Notice: Subject to any disclaimer, the term of this patent is extended or adjusted under 35 U.S.C. 154(b) by 332 days.

(21) Appl. No.: 17/603,010

(22) PCT Filed: Aug. 14, 2020

(86) PCT No.: PCT/CN2020/109136
§ 371 (c)(1),
(2) Date: Oct. 12, 2021

(87) PCT Pub. No.: WO2021/184658
PCT Pub. Date: Sep. 23, 2021

(65) Prior Publication Data
US 2022/0196089 A1    Jun. 23, 2022

(30) Foreign Application Priority Data

Mar. 17, 2020  (CN) .......................... 202010187278.X

(51) Int. Cl.
*F16D 65/00*    (2006.01)
*F16D 55/00*    (2006.01)
*F16D 65/10*    (2006.01)

(52) U.S. Cl.
CPC .... *F16D 65/0075* (2013.01); *F16D 2055/002* (2013.01); *F16D 2250/0084* (2013.01)

(58) Field of Classification Search
CPC .................. F16D 2055/002; F16D 65/0075
See application file for complete search history.

(56) References Cited

U.S. PATENT DOCUMENTS

2004/0074716 A1    4/2004  Brumfield et al.
2019/0084638 A1*   3/2019  Melcher .................. B62L 1/005

FOREIGN PATENT DOCUMENTS

| CN | 107237845 A |   | 10/2017 |   |           |
|----|-------------|---|---------|---|-----------|
| CN | 107289045 A |   | 10/2017 |   |           |
| CN | 108980235 A |   | 12/2018 |   |           |
| CN | 110388396 A | * | 10/2019 |   | F16D 55/226 |
| CN | 209604449 U |   | 11/2019 |   |           |
| CN | 209875797 U |   | 12/2019 |   |           |
| CN | 111306222 A |   | 6/2020  |   |           |
| JP | 2007145221 A | * | 6/2007 |   |           |
| WO | WO-2019162871 A1 | * | 8/2019 |   | F16D 55/228 |

* cited by examiner

*Primary Examiner* — Melody M Burch
(74) *Attorney, Agent, or Firm* — Bayramoglu Law Offices

(57) ABSTRACT

A caliper cover assembly and a production method thereof are provided. The caliper cover assembly includes a first bracket, a second bracket, and buckles; the first bracket and the second bracket are respectively integrally formed with the caliper cover body; the first bracket and the second bracket are symmetrically disposed, and are respectively provided with an installation hole; the buckles are provided in two; the two buckles are symmetrically and separately disposed on the first bracket and the second bracket, and fixedly connected with the first bracket or the second bracket through bolts passing through the installation holes respectively. Therefore, effects of a stable structure, a thermal conductivity, a convenient installation and a safety in use are achieved.

7 Claims, 2 Drawing Sheets

CALIPER COVER ASSEMBLY AND PRODUCTION METHOD THEREOF

CROSS REFERENCE TO THE RELATED APPLICATIONS

This application is the national stage entry of International Application No. PCT/CN2020/109136, filed on Aug. 14, 2020, which is based upon and claims priority to Chinese Patent Application No. 202010187278.X filed on Mar. 17, 2020, the entire contents of which are incorporated herein by reference.

TECHNICAL FIELD

Embodiments of the present application relate to the field of automotive accessories, and in particular to a caliper cover assembly and a production method thereof.

BACKGROUND

There are two forms of common caliper covers. One is made of early plastic material, and is fixed by glue, which is easy to be deformed and damaged after long-term use, thus affecting the driving safety of vehicle; the other is made of aluminum alloy material, in which an improved is made from glue bonding to fixation by screws. A shell and a bracket of such caliper cover are welded and fixed according to different profiles of the brake caliper during the installation process, and a bending process is carried out. Due to the unstable relationship between production tolerance and welding firmness, a lot of problems arise when installing the product; for example: 1. the degree of fit is poor; 2. the connection position of the shell and the bracket is prone to breakage; 3. a buckle is inserted into a gap between the brake caliper bracket and a top of a brake disc for fixed installation, wherein the buckle is greatly influenced by the gap and installation space, is prone to deformation, and will rub against the brake disc to produce abnormal noise and wear.

SUMMARY

To this end, embodiments of the present application provide a caliper cover assembly and a production method thereof, so as to solve the problem of interfering stability and safety of existing caliper covers.

In order to achieve the above object, embodiments of the present application provide the following technical solutions.

A caliper cover assembly includes a caliper cover body, a first bracket, a second bracket, and buckles; the first bracket and the second bracket are respectively integrally formed with the caliper cover body; the first bracket and the second bracket are symmetrically disposed, and are respectively provided with an installation hole; the buckles are provided in two; the two buckles are symmetrically disposed, separately disposed on the first bracket and the second bracket, and fixedly connected with the first bracket or the second bracket through bolts passing through the installation holes respectively.

As a further optimization, the first bracket includes a first straight portion, a first inclined portion, and a first vertical portion that are connected in sequence, and the first straight portion, the first inclined portion and the first vertical portion are integrally formed; the second bracket includes a second straight portion, a second inclined portion, and a second vertical portion that are connected in sequence, and the second straight portion, the second inclined portion, and the second vertical portion are integrally formed; the first straight portion and the second straight portion are symmetrically disposed, the first inclined portion and the second inclined portion are symmetrically disposed, and the first vertical portion and the second vertical portion are symmetrically disposed; the installation holes are disposed in the first vertical portion and the second vertical portion.

As a further optimization, a limiting protrusion is disposed at an end of the first straight portion that is away from the first inclined portion, and the limiting protrusion is integrally formed with the first straight portion.

As a further optimization, an installation groove is disposed in the first vertical portion and the second vertical portion respectively. As a further optimization, the buckle includes an installation portion, a connecting portion, and a limiting portion. One end of the installation portion is fixedly connected to the connecting portion, and the installation portion is fixed to the first bracket or the second bracket by bolts. A length direction of the connecting portion is along a width direction of the installation portion, and the connecting portion is perpendicular to the installation portion. The limiting portion is coplanar with the connecting portion, and a length direction of the limiting portion is perpendicular to the length direction of the connecting portion. The limiting portion and the installation portion are disposed in a staggered manner in the length direction of the connecting portion.

As a further optimization, a side of the caliper cover body that is connected to the first bracket and the second bracket is provided with a limiting ring plate that surrounds an edge of the caliper cover body by one turn, and the limiting ring plate is integrally formed with the caliper cover body.

As a further optimization, the first bracket and the second bracket are connected to a side of the limiting ring plate that is away from the caliper cover body.

As a further optimization, the first bracket, the second bracket and the limiting ring plate are respectively provided with thermally conductive silicone.

As a further optimization, the caliper cover body is made of aluminum alloy.

The present application also provides a method for producing a caliper cover assembly, which includes the following steps:

performing laser 3D scanning of a brake caliper, and obtaining profile parameters of a caliper cover body, a first bracket, a second bracket and buckles;

processing an integrally formed piece of the caliper cover body, the first bracket and the second bracket according to the profile parameters;

processing two buckles according to the profile parameters;

installing thermally conductive silicone on the caliper cover body, the first bracket and the second bracket respectively; and fixing the buckles to the first bracket and the second bracket by bolts.

The embodiments of the present application have the following advantages:

The caliper cover body, the first bracket and the second bracket are integrally formed, the structure is firm, and breakage is not easy to occur at the connection position, which is advantageous for driving safety; the structure of the first bracket and the second bracket can better fit the brake caliper and leads to a good stability; the buckles can be clamped and fixed with the brake caliper, and there is no need to insert them into the gap between the brake caliper bracket and the top of the brake disc, so the installation adaptability is better; the first bracket, the second bracket and the limiting ring plate are respectively provided with thermally conductive silicone so that heat conduction can be accelerated and the caliper cover assembly is prevented from affecting heat dissipation of the brake caliper.

BRIEF DESCRIPTION OF THE DRAWINGS

The accompanying drawing required to be used in the description of the embodiments of the present application or the related art are described briefly below, so that the technical solutions according to the embodiments of the present application or according to the related art will become clearer. It is apparent that the accompanying drawings in the following description are only illustrative. For those skilled in the art, other accompanying drawings may also be obtained according to these drawings provided, without any creative work.

The structure, proportion, size and the like shown in the specification are only used to cooperate with the contents disclosed in the specification for those skilled in the art to understand and read, and are not intended to limit the conditions with which the present application can be implemented. Therefore, they have no practical significance in a technical sense. Any modification to the structure, any change of the proportions or any adjustment to the size should fall within the scope covered by the technical contents disclosed in the present application without influencing the effects and objects that can be achieved by the present application.

DESCRIPTION OF REFERENCE SIGNS

1: caliper cover body; 11: limiting ring plate; 2: first bracket; 21: first straight portion; 22: first inclined portion; 23: first vertical portion; 231: installation groove; 232: installation hole; 24: limiting protrusion; 3: second bracket; 31: second straight portion; 32: second inclined portion; 33: second vertical portion; 4: buckle; 41: installation portion; 42: connecting portion; 43: limiting portion; 5: thermally conductive silicone.

DETAILED DESCRIPTION OF THE EMBODIMENTS

The implementations of the present application will be described in the specific embodiments below, and other advantages and functions of the present application can be readily understood by those skilled in the art from the contents disclosed in the specification. It is apparent that the described embodiments are part of the embodiments of the present application, instead of all of them. All the other embodiments obtained by those skilled in the art on the basis of the embodiments of the present application without creative efforts will fall within the scope of protection of the present application.

First Embodiment

Figure 1:
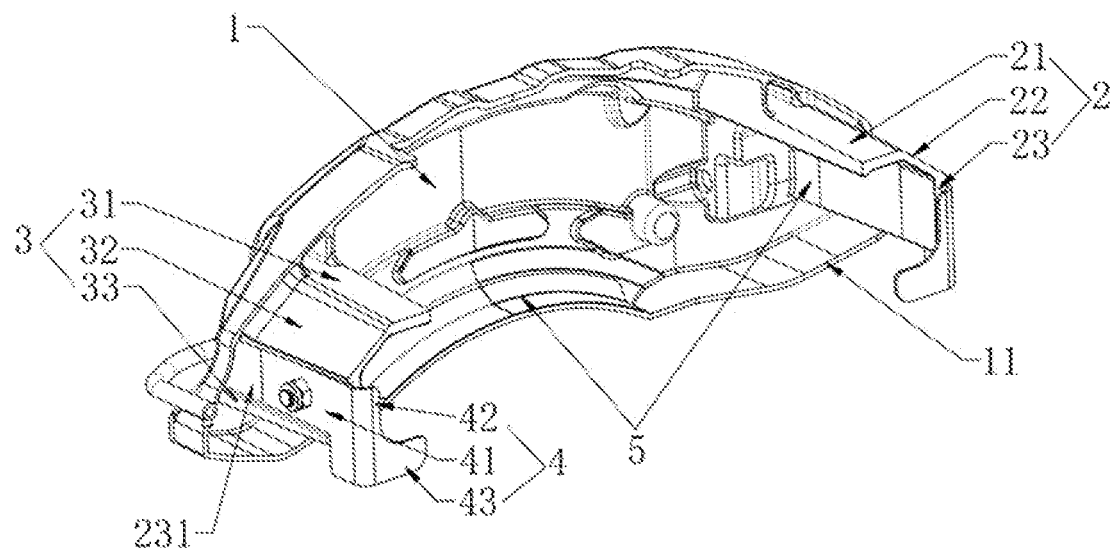
FIG. 1 is a schematic view of an overall structure of a first embodiment of the present application.
Figure 2:
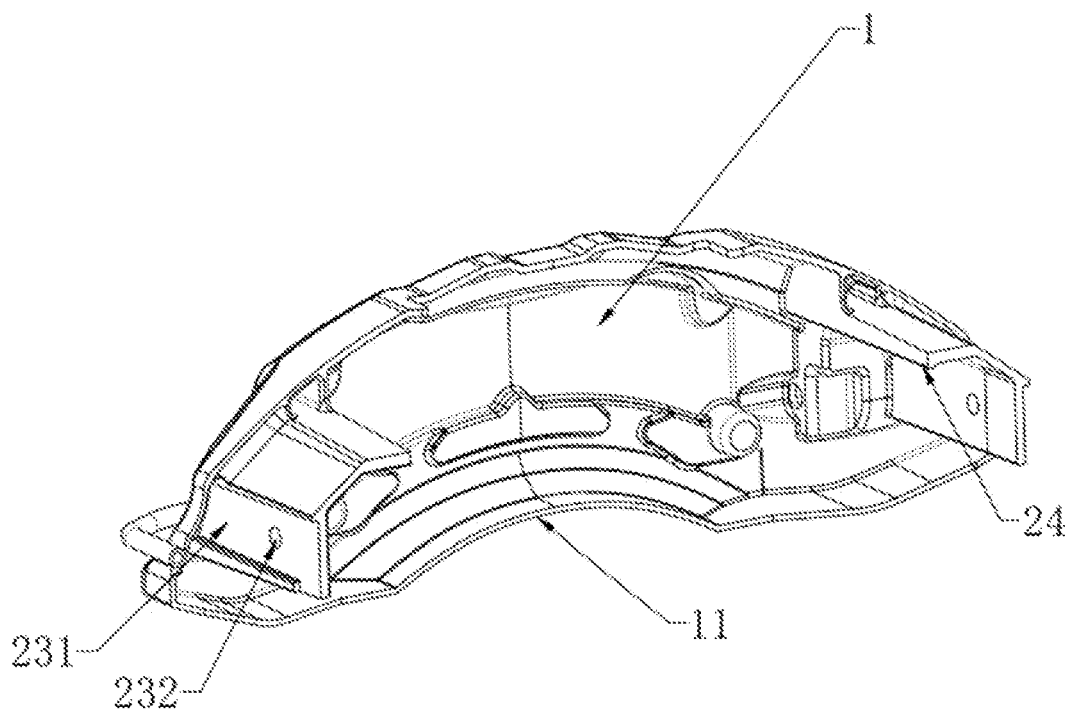
FIG. 2 is a schematic view of an overall structure of a caliper cover body in the present application.
Figure 3:
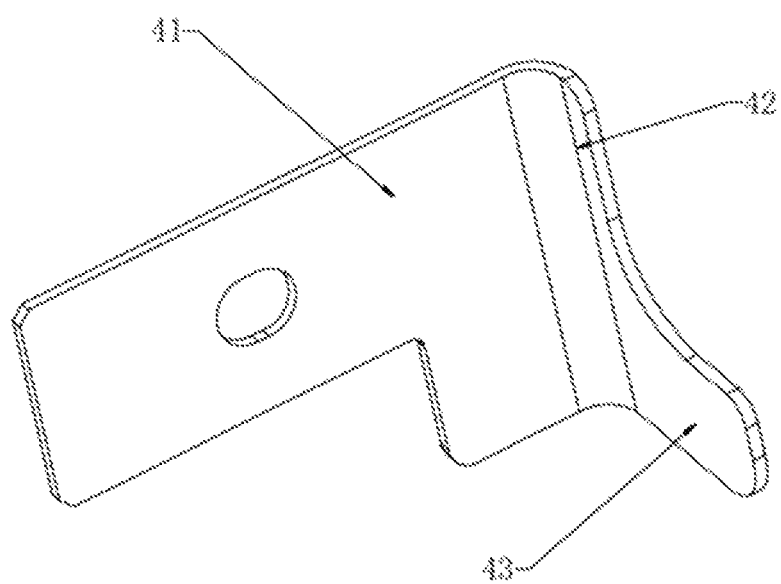
FIG. 3 is a schematic view of an overall structure of a buckle in the present application.

The embodiment of the present application provides a caliper cover assembly which, as shown in FIGS. 1 to 3, includes a caliper cover body 1, a first bracket 2, a second bracket 3 and buckles 4, wherein a decorative oil pipe, a decorative grease nipple and decorative nails are provided on the caliper cover body 1. The caliper cover body 1 is configured to be installed on the side of the brake caliper to block the brake caliper and increase the aesthetic effect of the brake caliper; the first bracket 2 and the second bracket 3 are respectively integrally formed with the caliper cover body 1 so that the connection structure of the first bracket 2, the second bracket 3 and the caliper cover is firm and reliable, and is not easy to break. The first bracket 2 and the second bracket 3 are symmetrically disposed at two ends of an upper portion on one side of the caliper cover body 1. The first bracket 2 and the second bracket 3 are respectively provided with an installation hole 232, which is a through hole penetrating the first bracket 2 or the second bracket 3. There are two buckles 4. The two buckles 4 are symmetrically disposed with respect to a plane perpendicular to a length direction of the caliper cover body 1. The symmetry plane of the first bracket 2 and the second bracket 3 is coplanar with the symmetry plane of the two buckles 4. The two buckles 4 are disposed on the first bracket 2 and the second bracket 3 separately, and are fixedly connected to the first bracket 2 or the second bracket 3 by bolts passing through the installation holes 232 respectively. The buckles 4 can play a fixing function.

The first bracket 2 includes a first straight portion 21, a first inclined portion 22, and a first vertical portion 23 that are connected in sequence. Each of the first straight portion 21, the first inclined portion 22 and the first vertical portion 23 is an elongated strip-shaped plate, and is fixed to one side of the caliper cover in a perpendicular manner, wherein the first straight portion 21 is perpendicular to the symmetry plane of the first bracket 2 and the second bracket 3, and the first vertical portion is parallel to the symmetry plane of the first bracket 2 and the second bracket 3; the first inclined portion 22 connects the first straight portion 21 and the first vertical portion, and the first straight portion 21, the first inclined portion 22 and the first vertical portion 23 are integrally formed; the second bracket 3 includes a second straight portion 31, a second inclined portion 32, and a second vertical portion 33 that are connected in sequence; the second straight portion 31, the second inclined portion 32 and the second vertical portion 33 are integrally formed. The first straight portion 21 and the second straight portion 22 are symmetrically disposed, the first inclined portion 22 and the second inclined portion 32 are symmetrically disposed, and the first vertical portion 23 and the second vertical portion 33 are symmetrically disposed. The installation holes 232 are disposed in the first vertical portion 23 and the second vertical portion 33, and the buckles 4 are fixed on the first vertical portion or the second vertical portion by bolts. When the caliper cover body 1 is placed on the side of the brake caliper, the first bracket 2 and the second brackets 3 are respectively overlapped on two shoulders on the upper end of the brake caliper, and the buckles 4 abut against a side of the brake caliper that is away from the caliper cover body 1, so that the caliper cover assembly is fixed to the outer side of the brake caliper.

Preferably, a lower side on an end of the first straight portion 21 that is away from the first inclined portion 22 is provided with a limiting protrusion 24. The limiting protrusion 24 is integrally formed with the first straight portion 21, and the limiting protrusion 24 can limit the first bracket 2 during the installation process. First, the first bracket 2 is installed in place through the limiting protrusion 24, and then the buckles 4 on the first bracket 2 and the second bracket 3 are fine-tuned according to the actual size of the brake caliper. Thus, the caliper cover assembly and the brake caliper are connected more closely.

Preferably, the first vertical portion 23 and the second vertical portion 33 are respectively provided with an installation groove 231, the installation groove 231 is provided with a notch at one end that is away from the caliper cover body 1, and the installation hole 232 is located in the installation groove 231. The width of the installation groove 231 is the same as the width of the buckle 4 at a position where it fits the first vertical portion 23 and the second vertical portion 33. The installation grooves 231 can make the connection between the buckles 4 and the first bracket 2 or the second bracket 3 more stable, and no rotation will occur.

The buckle 4 includes an installation portion 41, a connecting portion 42, and a limiting portion 43. Each of the installation portion 41, the connecting portion 42 and the limiting portion 43 has a plate-shaped structure. The installation portion 41 is fixed to the first bracket 2 or the second bracket 3 by bolts. The installation portion 41 is located in the installation groove 231, and one end of the installation portion 41 is fixedly connected to the connecting portion 42. A length direction of the connecting portion 42 is along a width direction of the installation portion 41. The length of the connecting portion 42 is larger than the width of the installation portion 41. The connecting portion 42 is perpendicular to the installation portion 41. The limiting portion 43 is coplanar with the connecting portion 42, and a length direction of the limiting portion 43 is perpendicular to the length direction of the connecting portion 42. The limiting portion 43 and the installation portion 41 are disposed in a staggered manner in the length direction of the connecting portion 42. When the caliper cover assembly is installed on the caliper, the limiting portion 43 and the first straight portion 21 or the second straight portion 31 clamp on upper and lower sides of the caliper, the limiting portion 43 and the caliper cover body 1 clamp on front and rear sides of the caliper, and the first vertical portion 23 and the second vertical portion 33 clamp on left and right sides of the caliper, so that the caliper cover assembly can be firmly installed on the caliper.

A side of the caliper cover body 1 that is connected to the first bracket 2 and the second bracket 3 is provided with a limiting ring plate 11 that surrounds an edge of the caliper cover body 1 by one turn. A width direction of the limiting ring plate 11 is perpendicular to the caliper cover body 1, and the limiting ring plate 11 is integrally formed with the caliper cover body 1. The limiting ring plate 11 can fit the edge of the caliper to further increase the stability of the installation of the caliper cover assembly.

The first bracket 2 and the second bracket 3 are connected to a side of the limiting ring plate 11 that is away from the caliper cover body 1, so that the first bracket 2 and the second bracket 3 occupy a small space on the side of the caliper cover body 1 that is close to the caliper. The degree of fit between the caliper cover body 1 and the caliper is higher.

Preferably, the first bracket 2, the second bracket 3 and the limiting ring plate 11 are respectively provided with thermally conductive silicone 5, and the thermally conductive silicone 5 is located on sides of the first bracket 2, the second bracket 3 and the limiting ring plate that fit the caliper. The heat generated on the caliper can be quickly transferred to the first bracket 2, the second bracket 3, the limiting ring plate 11 and the caliper cover body 1 through the thermally conductive silicone 5, which solves the problem of the caliper cover affecting heat dissipation of the caliper.

The caliper cover body 1 is made of aluminum alloy, which has good thermal conductivity, avoids overheating of the caliper, and has the advantages of good firmness, long service life, resistance to oxidation and easy processing.

The caliper cover assembly provided by the present application has a high degree of fit with the caliper, has a firm structure, is not prone to breakage, is not affected by gaps during installation, is more convenient to install, has good thermal conductivity, and has a higher degree of safety in use.

Second Embodiment

The embodiment of the present application provides a method for producing a caliper cover assembly, which includes the following steps:
 performing laser 3D scanning of a brake caliper to obtain profile parameters of the brake caliper, and obtaining profile parameters of the caliper cover body 1, the first bracket 2, the second bracket 3 and the buckles 4 according to the profile parameters of the brake caliper;
 processing an integrally formed piece of the caliper cover body 1, the first bracket 2 and the second bracket 3 according to the profile parameters through casting, extrusion, oxidation, etc.;
 processing two buckles 4 according to the profile parameters;
 installing thermally conductive silicone 5 on the caliper cover body 1, the first bracket 2 and the second bracket 3 respectively; and
 fixing the buckles 4 to the first bracket 2 and the second bracket 3 by bolts.

Since the caliper cover assembly is designed according to the profile parameters obtained by the laser 3D scanning of the caliper, the caliper cover assembly and the brake caliper can fit better, and are more stable and firm after installation. The caliper cover body 1 is integrally formed with the first bracket 2 and the second bracket 3 so that the connection firmness of the caliper cover body 1 with the first bracket 2 and the second bracket 3 is better, and breakage is less likely to occur as compared to welding.

While the present application has been described in detail with reference to the general description and specific embodiments above, it is apparent to those skilled in the art that some modifications or improvements may be made on the basis of the present application. Therefore, such modifications or improvements made without departing from the spirit of the present application will all fall within the scope of protection of the present application.

What is claimed is:

1. A caliper cover assembly, comprising a caliper cover body, a first bracket, a second bracket, and two buckles; wherein,
 the first bracket and the second bracket are respectively integrally formed with the caliper cover body;
 the first bracket and the second bracket are symmetrically disposed at two ends of an upper portion on one side of the caliper cover body, and are respectively provided with an installation hole;
 the two buckles are symmetrically, and separately disposed on the first bracket and the second bracket, one of the buckles fixed to the first bracket and another of the buckles fixed to the second bracket through bolts passing through the installation holes;

wherein each of the two buckles comprises an installation portion, a connecting portion, and a limiting portion; an end of the installation portion is fixedly connected to the connecting portion, and the installation portion is fixed to the first bracket or the second bracket by the bolts;

the connecting portion is perpendicular to the installation portion; and a length direction of the limiting portion is perpendicular to the length direction of the connecting portion;

the limiting portion and the installation portion are disposed in a staggered manner in the length direction of the connecting portion;

wherein the first bracket comprises a first straight portion, a first inclined portion, and a first vertical portion, wherein, the first straight portion, the first inclined portion, and the first vertical portion are connected in sequence, and the first straight portion, the first inclined portion and the first vertical portion are integrally formed;

the second bracket comprises a second straight portion, a second inclined portion, and a second vertical portion, wherein the second straight portion, the second inclined portion, and the second vertical portion are connected in sequence, and the second straight portion, the second inclined portion, and the second vertical portion are integrally formed;

the first straight portion and the second straight portion are symmetrically disposed, and the first vertical portion and the second vertical portion are symmetrically disposed;

the two installation holes are disposed in the first vertical portion and the second vertical portion respectively.

2. The caliper cover assembly according to claim 1, wherein a limiting protrusion is disposed at an end of the first straight portion away from the first inclined portion, and the limiting protrusion is integrally formed with the first straight portion.

3. The caliper cover assembly according to claim 1, wherein an installation groove is disposed in the first vertical portion and the second vertical portion respectively.

4. The caliper cover assembly according to claim 1, wherein a side of the caliper cover body connected to the first bracket and the second bracket is provided with a limiting ring plate surrounding an edge of the caliper cover body by one turn, and the limiting ring plate is integrally formed with the caliper cover body.

5. The caliper cover assembly according to claim 4, wherein the first bracket and the second bracket are connected to a side of the limiting ring plate away from the caliper cover body.

6. The caliper cover assembly according to claim 4, wherein the first bracket, the second bracket and the limiting ring plate are respectively provided with a thermally conductive silicone.

7. The caliper cover assembly according to claim 1, wherein the caliper cover body is made of an aluminum alloy.

* * * * *